United States Patent [19]

Boehme et al.

[11] 3,716,645

[45] Feb. 13, 1973

[54] STABILIZED TRANS-DIETHYL-STILBESTEROL COMPOSITIONS

[75] Inventors: Werner R. Boehme, Glen Ellyn; George Vuht, Chicago, both of Ill.

[73] Assignee: Dawes Laboratories, Inc., Chicago, Ill.

[22] Filed: Jan. 19, 1970

[21] Appl. No.: 4,081

[52] U.S. Cl.................424/346, 424/180, 260/619 B
[51] Int. Cl. ..............................................A61k 27/00
[58] Field of Search....424/346, 176, 180; 260/619 B

[56] References Cited

UNITED STATES PATENTS 2,751,303   6/1956   Burroughs...........................424/346

Primary Examiner—Sam Rosen
Attorney—McDougall, Hersh and Scott

[57] ABSTRACT

A composition of matter containing trans-diethylstilbestrol and from about 0.1 to about 50 percent by weight of a non-toxic acireductone based on the weight of said trans-diethylstilbestrol.

19 Claims, No Drawings

STABILIZED TRANS-DIETHYL-STILBESTEROL COMPOSITIONS

This invention relates to improved animal growth promoting compositions containing diethylstilbestrol. More specifically, it is directed to preserving the trans-configuration of stilbestrol by the addition of a small amount of a member of the group consisting of non-toxic aliphatic and alicyclic aci-reductones.

Diethylstilbestrol (DES) is widely employed in animal nutrition to accelerate the rate of weight gain and to improve the feed efficiency of ruminants. DES is customarily administered by incorporation of very small amounts into the feed, most commonly by dissolving the DES in a solvent such as a polyalkylene glycol or a vegetable oil and blending the resulting solution with an edible solid carrier to produce a premix containing from 2 to 4 grams of DES per pound. The premix is then blended further with nutritional feedstuffs and fortifiers to give a finished feed. Alternatively, the DES may be dissolved in a water-miscible solvent and the resulting solution diluted with water before mixing with the feed. An additional route of administration whereby DES is administered to animals is the implant method in which a pellet containing DES is implanted subcutaneously. The drug is thus gradually absorbed over a prolonged period of time, the absorption time being dependent upon the crystal size of the DES and the nature of the excipients present in the pellet. The benefits derived from treating beef cattle, for example, with DES are approximately a 12-15 percent improvement in daily weight gain and approximately a 10 percent increase in feed efficiency.

The isomer of DES which is employed in the feeding of animals has the trans-configuration and its standards of purity are specified in the United States Pharmacopoeia (Seventeenth Edition, page 183 (1965)). The cis-isomer of DES which is also described in the literature as pseudo-DES, on the other hand, is not used because its biological activity amounts to only about one-fourteenth that of the trans-isomer (Walton and Brownlee, Nature, 151, 305 (1943)). It is, therefore, of considerable economic importance to producers of beef cattle, sheep and other ruminants that the steric configuration of the DES employed be maintained in the trans form. Trans-DES, however, is readily isomerized in the presence of polar solvents such as alcohols or vegetable oils to an equilibrium mixture of isomers containing about 75-80% grans-DES, the remainder being the practically inactive cis-or pseudo-isomer. Numerous investigations of the instability of the biologically active isomer of DES have been reported. According to Nugelshofer et al. (Helv. chim. acta, 43, 1322 (1960)) and Ranes (J. Assoc. Off. Agri. Chem., 44, 323 1961)) trans-DES decomposes in the presence of light to an intensely yellow tetrahydrophenanthraquinone derivative. Wilder Smith and Williams (Nature, 156, 738 (1945), J. Endocrinol., 5, 152 (1947)) observed a loss of biological activity when trans-DES was treated with hydrogen peroxide, a reaction which produces DES-epoxide (Wessely and coworkers, Naturwis., 27, 131 (1939), Monatsh., 73, 127 (1940)). Wilder Smith and Williams (vide infra) also showed that an amount of hydroquinone equal to that of the DES afforded some protection to the biological activity of the drug at a concentration of 0.0001 percent in water. The very low solubility of DES in water, however, makes the use of aqueous solutions impractical for the fortification of animal feed.

We have observed that trans-DES rapidly isomerizes to an equilibrium ratio of isomers in a wide variety of polar organic solvents and that this isomerization occurs in the absence of light, acid or alkali. The degree of isomerization of trans-DES can be readily followed by the methods of gas liquid chromatograph (GLC). The usual chemical procedures for the assay of DES (Official Methods of Analysis, Tenth Ed., Washington, D.C., 1965, secs. 33.039-33.042; Dingemanse, Acta brev. neerl. Physiol., 9,118 (1939) on the other hand, do not distinguish between the two sterioisomers. In the GLC method, the solution of feed containing DES is rapidly extracted with a suitable solvent, the solvent evaporated and the residue is converted to its trimethylsilyl derivative (Smiley and Schall, J. Assoc. Off. Agri. Chem., 52, 107 (1969) with N, o-bis(trimethylsilyl)-acetamide (Pierce Chemical Company, Rockford, Ill.). The silylated derivative is diluted with acetone and injected into the GLC column which is packed with 3% OV-1 on 100–120 mesh Gas-Chrom Q (Applied Science Laboratories, Inc., State College, Pa.). Under the conditions of the test, during which the temperature of the column was raised from 175° C. at the time of injection at a rate of 4° C. per minute, the isomerized DES derivative appeared at the detector of the instrument in about 13.3 minutes and was followed by the trans-DES derivative about two minutes later. The proportion of each isomer present is determined from the relative area of each peak charted on the recorder by means of a disc integrator built into the instrument.

We have discovered that the isomerization of trans-DES to its practically inactive isomer can be inhibited by the incorporation of a small amount of an aci-reductone. The acireductones are a class of keto-enediols characterized by the grouping:

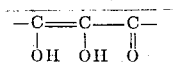

or its tautomeric forms.

The aci-reductone employed to preserve the steric configuration of trans-DES may be added in a premix or to the finished feed containing DES in an amount within the range of 0.1 to 50% by weight and preferably within the range of 2 to 25 percent by weight based on the stilbertrol. To insure an even distribution of DES and the aci-reductone throughout the feed we prefer to first dissolve the two ingredients in a solvent such as alcohol, glycerol, a polyalkylene glycol or a vegetable oil to obtain a solution containing from about 20 to 40 grams of DES per pound. This solution may then be applied with mixing to an edible solid carrier such as soy millfeed, corn cob meal or wheat middlings to produce a premix containing, for example, 2 grams of DES per pound. The premix is then further blended with grain and other fortifiers to make the finished feed. Alternatively, the solution of DES and aci-reductone, in polyethylene glycol may be diluted with, for example, 20 parts by weight of water and the resulting suspension of finely divided DES is blended directly into the animal feed.

In general, aliphatic and alicyclic aci-reductones were found to prevent the isomerization of trans-DES. The operable aliphatic aci-reductones may be represented by the following structural formula:

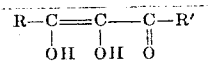

wherein R is selected from the group consisting of hydrogen, lower $C_1$-$C_6$ alkyl groups, mono- or polyhydroxy substituted lower $C_1$-$C_6$ alkyl and carboxyl groups, and R' is selected from the group consisting of hydrogen, lower alky, hydroxy and lower alkoxyl groups and their equivalent ammonium alkali and alkaline earth metal salts, esters and lactones. The operable alicyclic aci-reductones may be represented by the following structural formula:

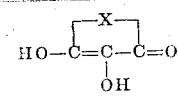

wherein X is selected from the group consisting of lower $C_1$-$C_6$ alkylene, mono- or polyhydroxy substituted lower $C_1$-$C_6$ alkylenes and their equivalent salts, esters and lactones.

Examples of the foregoing aci-reductones include erythorbic acid, ascorbyl palmitate, diethyl dihydroxy maleate dimethyl reductone, sodium reductinate, triose reductone, calcium dihydroxy acrylate, 3,4-dihydroxy tetrone, calcium erythorbate, sodium erythorbate, hydroxydimedone, calcium ascorbate, as well as a wide variety of others known to those skilled in the art.

The following examples serve to illustrate the practice of this invention without, however, limiting the scope thereof.

EXAMPLE I

STERIC STABILITY OF DES SOLUTIONS

A solution containing 20 grams of DES per pound of polyethylene glycol was prepared by dissolving 4.4 parts by weight of U.S.P. grade DES in 95.6 parts by weight of polyethylene glycol 200 (PEG-200, Union Carbide Corporation, New York, N.Y.) with brief warming to about 80° C. The clear solution was cooled to room temperature and analyzed for DES by GLC.

Similar solutions containing, in addition, 25% by weight based on DES of several aci-reductones were prepared. The aci-reductone (1.1 parts by weight) was dissolved in 94.5 parts by weight of PEG-200 with warming if necessary and followed by the addition of 4.4 parts by weight of DES.

DES (4.4 parts by weight) was dissolved in 95.6 parts by weight of cottonseed oil with heating and stirring. When all of the DES had dissolved the solution was cooled to room temperature.

A stabilized cottonseed oil solution of DES was prepared by dissolving 0.44 part by weight of ascorbyl palmitate in 95.16 parts by weight of cottonseed oil with the application of heat, adding 4.4 parts by weight of DES and stirring until a clear solution resulted.

A similar pair of solutions was prepared by the above method in which cottonseed oil was replaced by the mixed methyl esters of fatty acids derived from corn oil (CFE).

The solutions were analyzed by GLC as soon as possible after preparation and again after 24 hours and after 7 days at room temperature.

TABLE A

| No. | Solvent | Aci-reductone % by weight based on DES | Trans:cis ratio of DES | | |
|---|---|---|---|---|---|
| | | | ½ hr. | 24 hrs. | 7 days |
| 1 | PEG-200 | none | 98:2 | 86:14 | 80:20 |
| 2 | " | erythorbic acid 25% | 100:0 | 100:00 | 100:0 |
| 3 | " | ascorbyl palmitate, 25% | 100:0 | 100:0 | 97:3 |
| 4 | " | diethyl dihydroxy-maleate, 25% | 100:0 | 100:0 | 96:4 |
| 5 | " | dimethylreductone 25% | 100:0 | 100:0 | 96:4 |
| 6 | " | sodium reductinate 25% | 100:0 | 99:1 | 96:4 |
| 7 | " | triose reductone 25% | 100:0 | 100:0 | 95:5 |
| 8 | cottonseed oil | none | — | 91:9 | 82:17 |
| 9 | " | ascorbyl palmitate, 10% | — | 99:1 | 97:3 |
| 10 | CFE | none | — | 90:10 | 85:15 |
| 11 | " | ascorbyl palmitate, 10 | | 98:2 | 95:5 |
| 12 | ethanol | none | 99:1 | 97:3 | 91:9 |
| 13 | " | erythorbic acid, 25% | 100:0 | 100:0 | 99:1 |

EXAMPLE II

EFFECT OF ACI-REDUCTONE CONCENTRATION ON STERIC STABILITY OF DES

Solutions of DES in PEG-200 containing diminishing amounts of erythorbic acid were prepared as in Example I and tested for isomerization of DES by GLC.

TABLE B

| No. | Erythorbic Acid % by weight based on DES | Trans:cis ratio of DES | | |
|---|---|---|---|---|
| | | ½ hr. | 24 hrs. | 7 days |
| 1 | 10% | 100:0 | 100:0 | 100:0 |
| 2 | 5% | 100:0 | 100:0 | 100:0 |
| 3 | 2% | 100:0 | 100:0 | 99:1 |
| 4 | 1% | 100:0 | 100:0 | 99:1 |

EXAMPLE III

STABILIZATION OF DES IN AQUEOUS PEG-200 SOLUTIONS

To compare the effect of diluting DES solutions with water for the purpose of blending with a solid carrier, PEG-200 solutions containing 20 grams of DES per pound and 2 grams of aci-reductone per pound were prepared by the method described in Example I. One part by weight of the DES solution was thoroughly mixed with 19 parts by weight of water and the resulting milky suspension of finely divided DES was analyzed by GLC.

TABLE C

| No. | Aci-reductone | Trans:cis ratio of DES | | |
|---|---|---|---|---|
| | | ½ hr. | 24 hrs. | 7 days |
| 1 | none | 84:16 | 80:20 | — |
| 2 | erythorbic acid | 100:0 | 100:0 | 100:0 |
| 3 | ascorbyl palmitate | 100:0 | 100:0 | 99:1 |

EXAMPLE IV

STABILIZATION OF DES PREMIXES

A solution containing 20 grams of DES and 2 grams of erythorbic acid per pound of PEG-200 was prepared as in Example I. From this solution a 2 gram per pound premix was made by mixing 45.5 grams of the DES solution with 408 grams of soy millfeed in a laboratory blender. As a control, an identical solution in which the aci-reductone was omitted, was blended with millfeed. The two premixes, each containing 2 grams of DES per pound, were tested for isomerization by GLC.

TABLE D

| No. | Aci-reductone | Trans:cis ratio of DES | | | |
|---|---|---|---|---|---|
| | | ½ hr. | 24 hrs. | 7 days | 30 days |
| 1 | none | 98:2 | 91:9 | 85:15 | 80:20 |
| 2 | erythorbic acid | 100:0 | 100:0 | 99:1 | 98:2 |

EXAMPLE V

STABILIZATION OF DES IMPLANTS

Thirty parts by weight of Carbowax 6000 (Union Carbide corporation, New York, N.Y.) and five parts by weight of ascorbic acid were slowly heated on the steam bath until a homogeneous solution resulted. Fifty parts by weight of DES was then gradually added with constant mixing. The semi-solid mass was removed from the steam bath and 5 parts of calcium stearate was slowly blended into the mass with constant mixing until cool. The mass, which had now practically solidified, was granulated and formed into tablets each weighing 27 milligrams. GLC analysis demonstrated that no isomerization to cis-DES had occurred after 1 week in an incubator at 37° C.

WE CLAIM:

1. An animal growth promoting composition of improved steric stability comprising trans-diethylstilbestrol and from about 0.1 to about 50 percent by weight of a non-toxic aci-reductone based on the weight of said diethylstilbestrol and in which the acireductone is selected from the group consisting of an aliphatic acireductone having the structural formula:

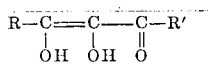

in which R is selected from the group consisting of hydrogen, a lower $C_1 - C_6$ alkyl group, a mono- or polyhydroxy substituted lower $C_1 - C_6$ alkyl group and a carboxyl group, and R' is selected from the group consisting of hydrogen, a lower alkyl group, a hydroxy group and a lower alkoxy group, and their ammonia, alkali metal and alkaline earth metal salts, an alicyclic aci-reductone having the structural formula:

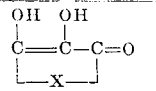

in which X is selected from the group consisting of a lower $C_1 - C_6$ alkylene group and a mono- or polyhydroxy substituted lower $C_1 - C_6$ alkylene group, or the acireductones 3,4-dihydroxy tetrone, calcium erythorbate, sodium erythorbate, calcium ascorbate, erythorbic acid and ascorbyl palmitate.

2. A composition of claim 1 wherein the aci-reductone is selected from the group consisting of erythorbic acid, ascorbyl palmitate, diethyl dihydroxy maleate, dimethyl reductone, sodium reductinate, triose reductone, calcium dihydroxy acrylate, 3,4-dihydroxy tetrone, calcium erythorbate, sodium erythorbate, hydroxydimedone, calcium ascorbate.

3. A composition of claim 1 wherein the aliphatic aci-reductone is erythorbic acid.

4. A composition of claim 1 wherein the aliphatic aci-reductone is ascorbic acid.

5. A composition of claim 1 wherein the aliphatic aci-reductone is triose reductone.

6. A composition of claim 1 wherein the aliphatic aci-reductone is ascorbyl palmitate.

7. A composition of claim 1 wherein the aliphatic aci-reductone is diethyl dihydroxymaleate.

8. A liquid animal growth promoting composition of improved steric stability comprising at least 1 gram of trans-diethylstilbestrol and from about 0.1 to about 50% by weight of a non-toxic aci-reductone based upon said trans-diethylstilbestrol dissolved in a liquid carrier selected from the group consisting of a mono- or polyhydric alcohol or an ester of a long chain fatty acid and in which the aci-reductone is selected from the group consisting of an aliphatic aci-reductone having the structural formula

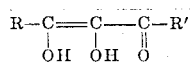

in which R is selected from the group consisting of hydrogen, a lower $C_1$ to $C_6$ alkyl group, a mono- or polyhydroxy substituted lower $C_1$ to $C_6$ alkyl group and a carboxyl group, and R' is selected from the group consisting of hydrogen, a lower alkyl group, a hydroxy group and a lower alkoxy group, and their ammonia, alkali metal and alkaline earth metal salts, an alicyclic aci-reductone having the structural formula:

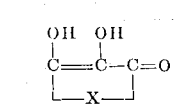

in which X is selected from the group consisting of a lower $C_1$ to $C_6$ alkylene group and a mono- or polyhydroxy substituted lower $C_1$ to $C_6$ alkylene group, or the acireductones 3,4-dihydroxy tetrone, calcium erythorbate, sodium erythorbate, calcium ascorbate, erythorbic acid and ascorbyl palmitate.

9. A composition of claim 8 wherein the carrier is ethanol.

10. A composition of claim 8 wherein the carrier is polyethylene glycol.

11. A composition of claim 8 wherein the carrier is cottonseed oil.

12. A composition of claim 8 wherein the carrier is the mixed methyl ester derived from the fatty acids obtained from corn oil.

13. An animal growth promoting premix comprising at least 1 gram of trans-diethylstilbestrol per pound and from about 0.1 to about 50 percent by weight of a non-toxic acireductone based upon the weight of said trans-diethylstilbestrol intimately dispersed in an edible solid carrier and in which the aci-reductone is selected from the group consisting of an aliphatic aci-reductone having the structural formula:

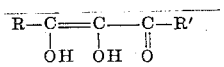

in which R is selected from the group consisting of hydrogen, a lower $C_1$ to $C_6$ alkyl group, a mono- or polyhydroxy substituted lower $C_1$ to $C_6$ alkyl group and a carboxyl group, and R' is selected from the group consisting of hydrogen, a lower alkyl group, a hydroxy group and a lower alkoxy group, and their ammonia, alkali metal and alkaline earth metal salts, an alicyclic aci-reductone having the structural formula:

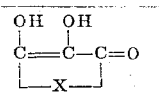

in which X is selected from the group consisting of a lower $C_1$ to $C_6$ alkylene group and a mono- or polyhydroxy substituted lower $C_1$ to $C_6$ alkylene group, or the acireductones 3,4-dihydroxy tetrone, calcium erythorbate, sodium erythorbate, calcium ascorbate, erythorbic acid and ascorbyl palmitate.

14. A composition of claim 13 wherein the aci-reductone is erythorbic acid.

15. A solid subcutaneous absorbable implant pellet comprising trans-diethylstilbestrol and from about 0.1 to about 50% by weight of an aci-reductone based upon the weight of said trans-diethylstilbestrol and in which the aci-reductone is selected from the group consisting of erythorbic acid, ascorbyl palmitate, diethyl dihydroxy maleate, dimethyl reductone, sodium reductinate, triose reductone, calcium dihydroxy acrylate, 3,4-dihydroxy tetrone, calcium erythorbate, sodium erythorbate, hydroxydimedone, calcium ascorbate.

16. A composition of claim 15 wherein the aci-reductone is ascorbic acid.

17. The process for preventing isomerization of trans-diethylstilbestrol to the cis form comprising combining the trans-diethylstilbestrol with 0.1 to 50 percent of its weight of a non-toxic aci-reductone selected from the group consisting of an aliphatic aci-reductone having the structural formula:

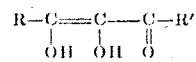

in which R is selected from the group consisting of hydrogen, a lower $C_1 - C_6$ alkyl group, a mono- or polyhydroxy substituted lower $C_1 - C_6$ alkyl group and a carboxyl group, and R' is selected from the group consisting of hydrogen, a lower alkyl group, a hydroxy group and a lower alkoxy group, and their ammonia, alkali metal and alkaline earth metal salts, an alicyclic aci-reductone having the structural formula:

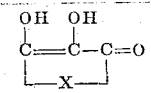

in which X is selected from the group consisting of a lower $C_1$ to $C_6$ alkylene group and a mono- or polyhydroxy substituted lower $C_1 - C_6$ alkylene group, or the aci-reductones 3,4-dihydroxy tetrone, calcium erythorbate, sodium erythorbate, calcium ascorbate, erythorbic acid and ascorbyl palmitate.

18. The process as claimed in claim 17 in which the aci-reductone is present in an amount within the range of 2 to 25% by weight of the trans-diethylstilbestrol.

19. A process as claimed in claim 17 in which the aci-reductone is dissolved in a liquid vehicle which serves as a carrier for the trans-diethylstilbestrol.

* * * * *